United States Patent [19]

Klees et al.

[11] Patent Number: 4,501,393

[45] Date of Patent: Feb. 26, 1985

[54] INTERNALLY VENTILATED NOISE SUPPRESSOR WITH LARGE PLUG NOZZLE

[75] Inventors: Garry W. Klees, Mercer Island; Charles P. Wright, Seattle, both of Wash.

[73] Assignee: The Boeing Company, Seattle, Wash.

[21] Appl. No.: 405,962

[22] PCT Filed: Mar. 17, 1982

[86] PCT No.: PCT/US82/00327

§ 371 Date: Mar. 17, 1982

§ 102(e) Date: Mar. 17, 1982

[87] PCT Pub. No.: WO83/03281

PCT Pub. Date: Sep. 29, 1983

[51] Int. Cl.³ .................. B64D 33/04; F01N 1/14; F02K 1/08
[52] U.S. Cl. .................. 239/265.13; 239/265.29; 239/265.31; 181/215; 181/219; 181/220; 60/262
[58] Field of Search ............... 181/213, 215, 216, 219, 181/220; 239/265.13, 265.19, 265.17, 265.27, 265.29, 265.31, 265.33, 127.1, 127.3; 60/230, 262, 263, 204

[56] References Cited

U.S. PATENT DOCUMENTS

| 2,987,879 | 6/1961 | Brown | 239/265.17 |
|---|---|---|---|
| 3,032,981 | 5/1962 | Lawler | 239/265.13 X |
| 3,262,264 | 7/1966 | Gardiner et al. | 239/265.29 X |
| 3,333,772 | 8/1967 | Bruner | 239/265.13 |
| 3,432,100 | 3/1969 | Hardy et al. | 239/127.3 |
| 3,493,178 | 2/1970 | Bruner | 239/265.13 |
| 3,578,106 | 5/1971 | Ellis | 181/220 |
| 3,637,041 | 1/1972 | Hilbig | 181/219 |
| 3,695,387 | 10/1972 | Hilbig | 181/219 |
| 3,747,855 | 7/1973 | Vdoviak et al. | 239/265.29 |
| 3,779,282 | 12/1973 | Klees | 137/625.46 |
| 3,780,827 | 12/1978 | Straight | 181/216 |
| 3,792,584 | 2/1974 | Klees | 60/204 |
| 3,854,286 | 12/1974 | Klees | 60/204 |
| 3,910,375 | 10/1975 | Hache et al. | 181/215 |
| 3,938,328 | 2/1976 | Klees | 60/262 |
| 4,026,472 | 5/1977 | Rabone | 239/127.3 |
| 4,054,030 | 10/1977 | Pedersen | 60/262 |
| 4,085,583 | 4/1978 | Klees | 60/204 |
| 4,291,782 | 9/1981 | Klees | 239/265.33 |

Primary Examiner—Benjamin R. Fuller
Attorney, Agent, or Firm—Delbert J. Barnard; Eugene O. Heberer; Joan H. Pauly

[57] ABSTRACT

A jet engine noise suppressor particularly adapted for supersonic aircraft. The nozzle (10) has an internal wall surface (70) around a generally centrally positioned body (50) and an annular area (62) extending between the wall and the body. In this area there are separate gas and air flow ducts (64, 66) having entrance ends (82, 80) and exit ends (76, 78), the entrance ends of the gas ducts extending annularly around the body (50) to receive gas exhaust from the engine and the air ducts have entrance ends annularly outwardly of the gas ducts along the wall (70). There are openings (26) in a wall (14) upstream of the ducts to supply ambient air to the entrance ends (80) of the air ducts. There are doors (20) and actuators (24) operable to open and close the openings (26). The ducts are arranged to direct the flow patterns at the exit ends (76, 78) in a relationship inverted from that existing at the entrance ends (80, 82) so that the gas ducts (64) discharge annularly outwardly along shroud (100) and the air ducts (66) discharge annularly inwardly along the body (50). There is an annulus downstream of the ducts extending between the shroud (100) and the body (50) in which there are longitudinally directed flaps extending annularly around the body and within the shroud. The flaps (126) vary the flow path sizes of the gas exhaust and air ejected outwardly of the ducts according to various flight mode requirements of the engine. There is also a thrust reverser (102) in the shroud which is translatable from an inner position to an outer position, the flaps directing the gas flow through the thrust reverser for stopping the airplane on landing.

25 Claims, 10 Drawing Figures

INTERNALLY VENTILATED NOISE SUPPRESSOR WITH LARGE PLUG NOZZLE

TECHNICAL FIELD

The invention relates to noise suppressors for jet engines and particularly, for jet engines for supersonic aircraft.

BACKGROUND ART

Multi-element jet engine noise suppressor nozzle systems have presented considerable design problems in the past. They have been difficult to fabricate and to stow away during cruise flight. Their overall girth, length, and base area have in some cases restricted take-off roll attitudes and have produced aerodynamic drag penalties. Their fixed nozzle discharge areas do not benefit some engines which require a variable nozzle area to accommodate a change in the engine power setting. Further, multi-element jet noise suppressors have tended to be ineffective at lower jet velocities common with the lower power settings for turbojet engines as well as the entire range of power settings for high bypass ratio engines.

A jet noise suppression device for large supersonic airplanes has several unique requirements which must be satisfied. The first is to provide a low drag pod, and this normally necessitates that nothing protrudes or increases the diameter of the aft cowl portion beyond that diameter which has been selected for optimum thrust-minus-drag.

The second requirement is to provide structure having reasonably small drag penalties at subsonic cruise and takeoff conditions. The nozzle functions must provide a thrust reverser with adequate flow area so that the exhaust gas can be directed to selected areas where reingestion is minimized. Only about one half of the perimeter of the exhaust system is usable because of this requirement.

The third is that a high level of jet noise suppression is required for large supersonic airplanes at takeoff in order to meet the future FAA noise rule goals.

In the prior art, internal ventilation for jet noise control has been attempted. Crossover tubes, similar to those disclosed in U.S. Pat. No. 3,779,282, have been used to provide internal ventilation but they become less practical as the ventilation requirement increases. In a typical large supersonic airplane, for example, the ventilation jet area must be about equal to the main jet area in order to achieve the necessary large noise suppression level. A typical exhaust system for a large supersonic aircraft, such as the SST, can theoretically provide this flow area if the blockage of the supply and collection ducts are close to zero. This is practically impossible to achieve with crossover tubes because a supply and collection annulus must be integrated with the tubes and this uses up a large part of the available area. From the known prior art, it appears that the solution of the problem of maximizing the amount of ventilation air has not been attempted in the above aircraft engines.

A search of the patent literature illustrates a number of systems in which ambient air has been introduced into a jet engine nozzle so as to flow adjacent the central streamlined body in the nozzle. U.S. Pat. No. 3,432,100 discloses such a system in which ventilating air is fed into the nozzle through opening flaps 12 so as to converge with an inner exhaust driving stream and flow along a central streamlined body.

U.S. Pat. No. 3,637,041 discloses a fanjet engine having a noise suppressor in the tail pipe. There are partitions spaced around the periphery of an inner wall of a shroud and they extend radially inwardly to divide the engine discharge zone into two sets of alternately interposed flow passages. One set of vanes in the flow passages deflects fan air inwardly into the turbine exhaust gas flow and a second set of vanes deflects the turbine exhuast gas outwardly into the fan airflow, so as to mix the exhaust gas and the air to reduce the noise level.

U.S. Pat. No. 3,910,375 illustrates a jet engine silencer in which ambient air is permitted to flow from the exterior of the nozzle into a central body. The entry direction is such to cause substantial loss in the volume of flow due to friction and flow turbulence. The air is caused to mix with the exhaust gases externally of the nozzle. This arrangement provides for only a small internal ventilation area.

U.S. Pat. No. 3,779,282 provides a flow control system for inverting the positions of two adjacent constant air flow patterns. Such a device is adapted to be used in a jet engine annulus in which the total flow may divided into two separate equal or unequal constant area duct means having a combined total cross-sectional area substantially equal to the cross-sectional area of the original passageway in the form of an annulus. The flow patterns are formed in annular first and second ducts divided into duct elements shaped and arranged such that two annular flow patterns are discharged at the exit end of the passageway in an inverted relationship to that which exists at the entrance end of the passageway. U.S. Pat. Nos. 4,085,583; 3,792,584; 3,854,286; and 3,938,328 illustrate uses of the device disclosed in U.S. Pat. No. 3,779,282.

The following additional patents, found in the search, disclose noise suppressors for jet engines:
U.S. Pat. No. 3,032,981
U.S. Pat. No. 3,262,264
U.S. Pat. No. 3,333,772
U.S. Pat. No. 3,493,178
U.S. Pat. No. 3,578,106
U.S. Pat. No. 3,695,387
U.S. Pat. No. 4,026,472
U.S. Pat. No. 4,054,030

DISCLOSURE OF THE INVENTION

The invention is a jet engine noise suppressor particularly adaptable for use in nozzles having a large central streamlined plug as used with large supersonic engines in aircraft, such as an SST. The nozzle is generally annular in cross section and has an annular area extending between the inner wall or walls of the nozzle and the plug.

In a portion of the annular area there extends longitudinal separate gas and airflow ducts having entrance ends and exit ends, the gas ducts having entrance ends around the plug to receive gas exhaust from the engine and the air ducts having entrance ends radially outwardly of the gas ducts along the inner wall of the nozzle. There are ambient air inlet openings in the wall upstream of the ducts to supply the ambient air to the entrance ends of the air ducts. The inlets extend annularly around the nozzle and each inlet has a door with means to open and close the same.

The ducts are constructed to cross over each other for discharging two separate coannular flow patterns at the exit ends in a relationship inverted from that existing at the entrance ends. Thus, the gas ducts discharge radially outwardly along the nozzle wall structure and the air ducts discharge annularly inwardly along the plug.

Downstream of the ducts a shroud is formed on the nozzle, there being an annulus between the shroud and the plug. There are a series of aerodynamic flaps annularly arranged in the annulus for directing the gas and air flows from the ducts, the flaps being pivotally mounted at one end thereof adjacent and between the exits of the gas and air ducts. There are means to pivot the flaps for regulating the flow from the respective ducts in accordance with the flight mode requirements.

There is a thrust reverser in the shroud, normally fitted with a cover, and there are means to translate the cover, shroud, and reverser axially inwardly and outwardly with respect to the ducts. There are also means to remove the cover from the reverser when it is in an axially outwardly position and to return the cover to the normal covering position. The flaps have axially outer portions being adapted to be pivoted against the shroud downstream of the reverser, in the axially outwardly position and uncovered, to direct the gas exhaust through the reverser.

When the shroud is in its axially outwardly position, the flaps are adapted to be pivoted to remove them from the flow path of the gas ducts to provide a maximum gas flow out through the shroud for supersonic climbing and cruise flight modes. During these operations, the flaps close the air ducts. For takeoff, subsonic cruise, and perhaps during transonic climb modes, the flaps are adapted to be positioned in a predetermined location so as to permit flow from both the air ducts and the gas ducts out through the shroud, and provide jet area control for the engine.

The invention significantly reduces the radiation of jet noise by the introduction of large amounts of ventilation flow through the air ducts without blocking the gas exhaust flow appreciably, without enlarging the nozzle diameter beyond the optimum size for thrust-minus-drag, permits a variation in nozzle discharge area, and is easily stowed for cruise flight. The suppressor is effective at all jet velocities, even for low jet velocities common to turbojet lower power settings and high bypass ratio engine conditions.

The longitudinal crossover arrangement and the annular overlapping of the gas and air ducts, so that their respective cross sections are adjacent throughout, along with the inverting of the exit ends from the positions of the entrance ends, provides for the large amount of ventilation flow as required without enlarging the nozzle. The large volume of air from the exterior of the nozzle also improves thrust performance as well as jet noise reduction characteristics.

In addition to the foregoing, it has been surprisingly found that the present invention produced 4.3% more static thrust at a nozzle pressure ratio, $P_{total}/P_{ambient}$, of 4.5 than the equivalent reference plug nozzle without the suppressor.

The present invention in combination with a large plug nozzle adds an incremental amount of jet noise suppression to the 2 to 4 Effective Perceived Noise Level dB (EPNdB) suppression provided by the plug alone. Thus, the combination is particularly desirable for SST applications. During flight over a community, ambient flow induced by low static pressure at the ventilation exit, induces flow between the annulus jet and the large plug. This ventilated flow mixes with the jet forming a larger, lower velocity jet. Because jet noise level is most sensitive to jet velocity and much less sensitive to area, mass flow, or gas density, there is an overall reduction in radiated jet mixing noise. The equation of conservation mass and momentum can be used to predict the properties of the mixed jet.

Tests have shown for the present invention, that an area ratio (including plug cross section area) 2.0 nozzle with ventilation flow velocity of 500 FPS is estimated to obtain 12 EPNLdB suppression in flight compared to an unventilated large plug nozzle. Area ratio is defined as $AR = A_{Total}/A_{Jet}$. As ventilation weight-flow increases from 0 to 350 pounds per second (full scale), the jet noise suppression increases from 4.5 EPNLdB to 9.1 EPNLdB. Because the ventilation flow mixes with the jet to produce a lower velocity jet, flight effects are expected to enhance jet noise suppression. Tests have further shown that as ventilation weight flow increases, the peak noise is reduced in the lower frequency portion of the spectrum.

The introduction of high ambient weight flows for internal ventilation, according to the invention, occurs without any base drag penalties. The engine output is not unduly blocked by the ventilation flow ducts and the inventive system does not interfere with the nozzle area control system or thrust reverser mechanism.

For subsonic flight only, the present invention may be constructed with a fixed nozzle in which air ejector doors are always open and the nozzle flaps in the shroud are fixed in a predetermined position, except for operating the thrust reverser.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes.

BEST MODE FOR CARRYING OUT THE INVENTION

Referring again to the drawings, there is shown in FIGS. 1-6 a large plug nozzle 10 adaptable for use on a supersonic jet engine having an after end terminating at 12.

Figure 1:
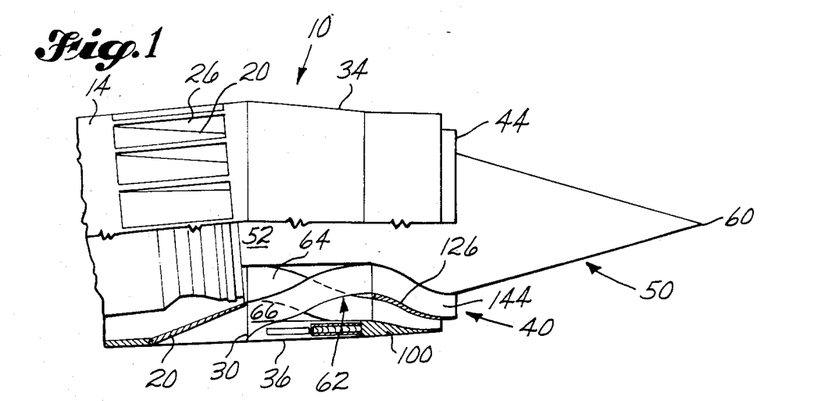
FIG. 1 is a partially cross-sectional side view of an internally ventilated noise suppressor in a large plug nozzle, according to the invention, showing the noise suppressor in position for takeoff and subsonic cruise modes of flight.
Figure 2:
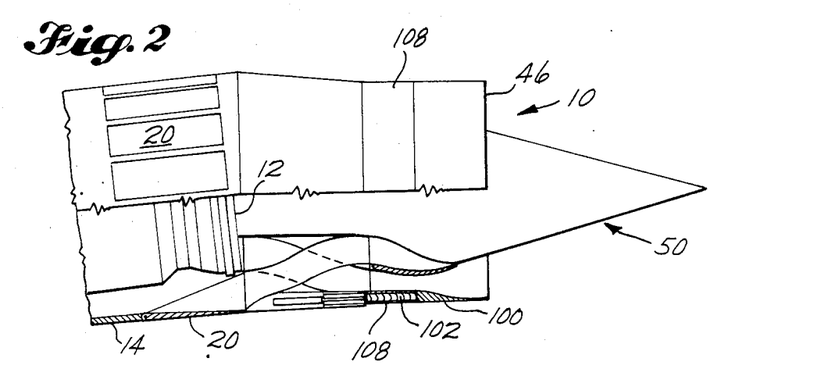
FIG. 2 is a view illustrating the suppressor in FIG. 1 in position for supersonic climbing and cruise modes of flight.
Figure 3:
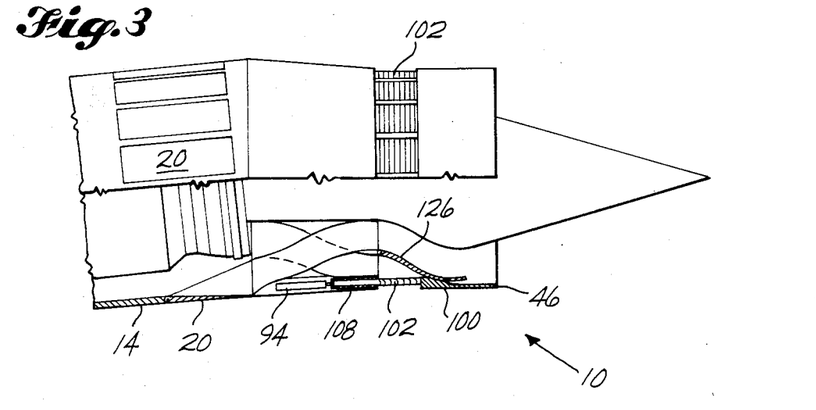
FIG. 3 is a view of the noise suppressor shown in FIG. 1, in position for the reverse thrust mode of flight.
Figure 4:
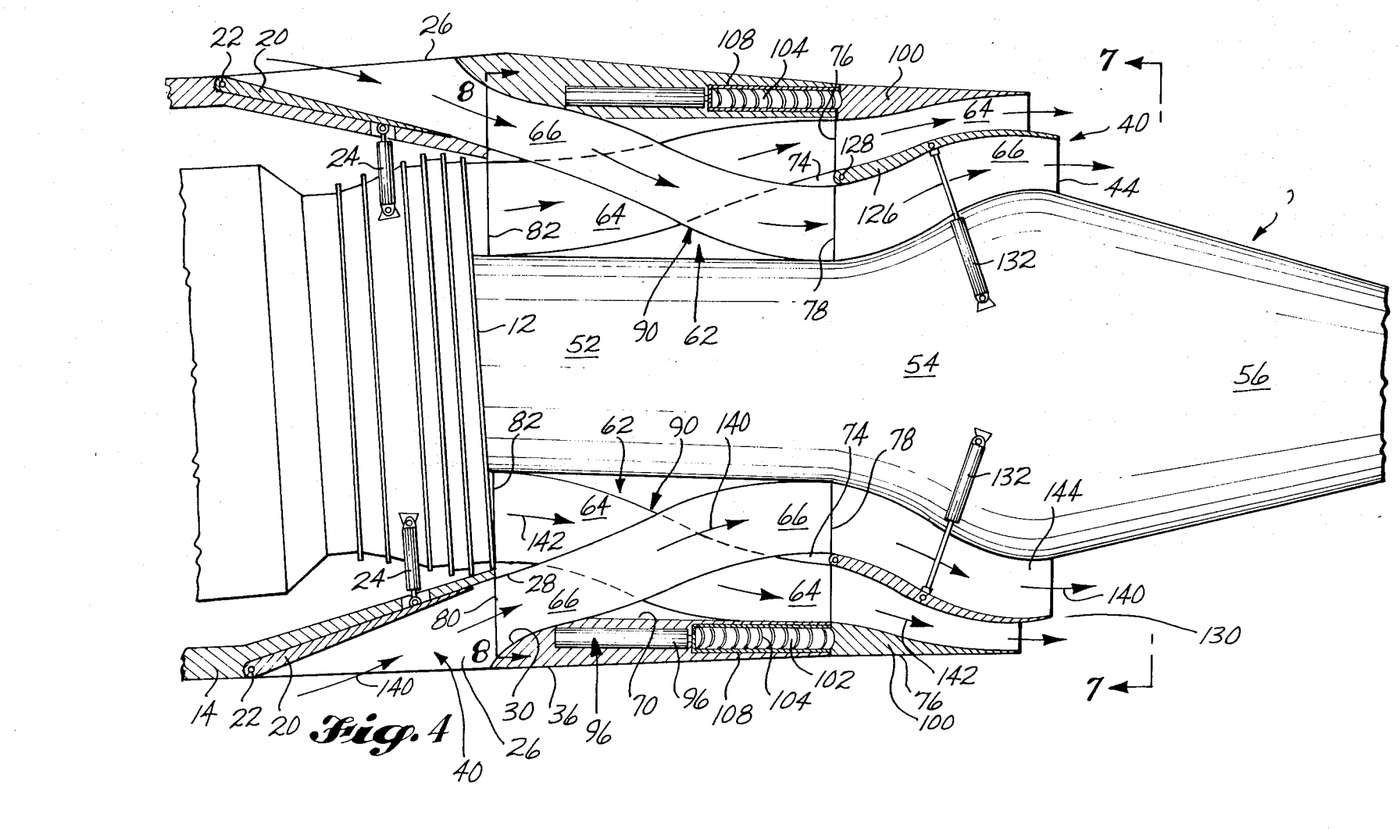
FIG. 4 is a detailed partially cross-sectional view of the noise suppressor and operating conditions shown in FIG. 1.
Figure 5:
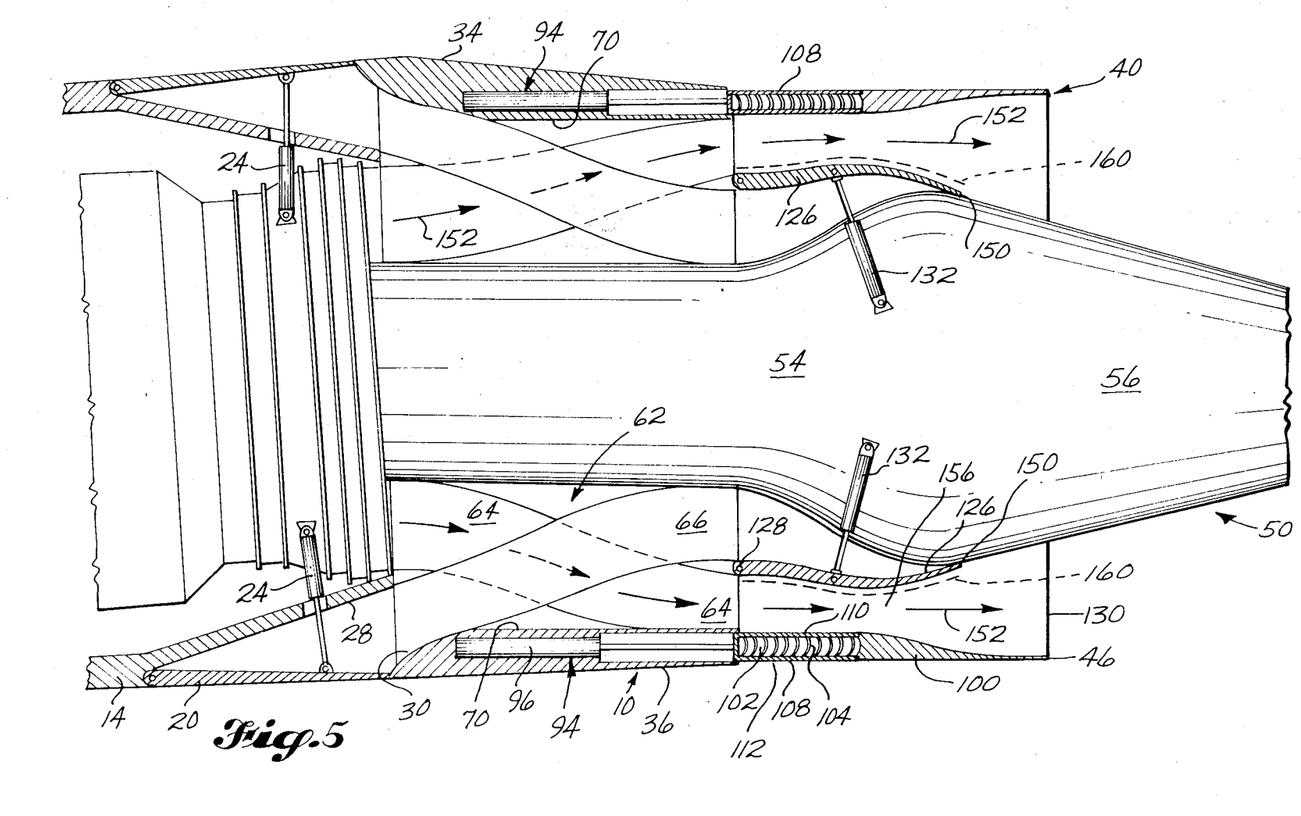
FIG. 5 is an enlarged detailed view of the noise suppressor in the operative conditions shown in FIG. 2.

As shown in FIGS. 1 and 4, the after end of the engine is surrounded by a nacelle 14 having ambient air ejector doors 20, annularly spaced around its circumference shown in the open position in FIGS. 1 and 4 and in the closed position in FIGS. 2 and 5. The ejector doors 20 are pivotally mounted at their forward ends 22 and are opened and closed by actuators 24 having one end connected to a structural surface of an engine and having the other end pivotally connected to a door.

The ejector doors open and close ambient air ejector openings or entries 26 extending around the nacelle in register with the doors. The openings 26 form gentle entries with a large radius and have aerodynamic contours on the entry ramps 28 and on the lip 30. The ramps may have entrance angles in a range of about 10 to 15 degrees in cross section as shown in FIG. 4, for example.

The after end of the nacelle is joined by generally cylindrical outerwalls 34 and 36 of the nozzle 10. The external pod shape indicated by the nacelle 14 and the walls 34 and 36 provide for a minimum drag without compromising structure of the internal ventilation noise suppressor, generally designated as 40, which extends longitudinally from the ejector entries 26 to the after end of the nozzle, as indicated at 44 in FIGS. 1 and 4 and 46 in FIGS. 2 and 5.

Fixed within the engine is a large plug 50 having an upstream small diameter cylindrical portion 52, an enlarged approximately conical portion 54 and outer cone portion 56, terminating in a point 60, FIGS. 1 and 4. Surrounding nozzle portion 52, fitted within an annulus 62 within the annular wall 70, are crossover engine exhaust ducts 64 and air ejector ducts 66. The ducts extend longitudinally from the entry lip 30 to the outer end of an annular wall 74, spaced between the exits 76 of the engine gas exhaust ducts 64 and the exits 78 of the air ejector ducts 66.

Figure 8:
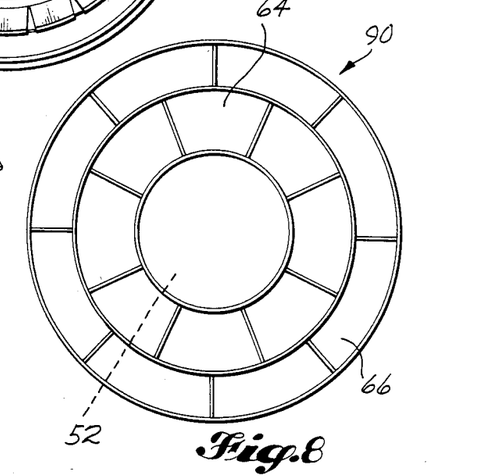
FIG. 8 is an upstream end view of an annulus inverting passageway flow control portion of the suppressor in which gas exhaust from a jet engine and ambient air flow through crossover ducts are inverted at the downstream end, taken along the lines 8—8.
Figure 9:
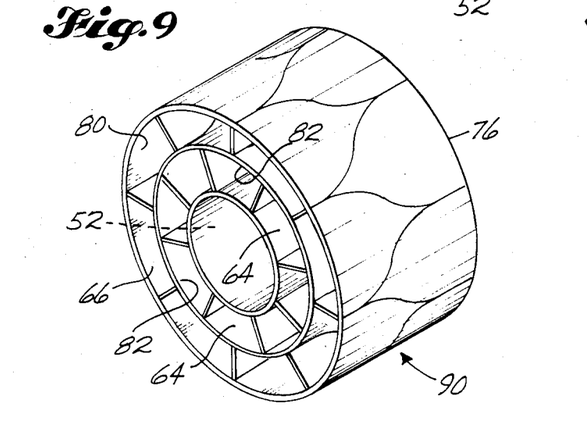
FIG. 9 is an isometric view of the inverting crossover device shown in FIGS. 4-8.

As may be seen in FIGS. 4, 8 and 9, the air ducts have entrances 80 just downstream from the engine afterend 12 and the gas exhaust ducts 64 are connected to receive the gas exhaust at their entrances 82.

As shown in FIGS. 4 and 9, the air ejector ducts 66 and the gas exhaust ducts 64 within the annulus 62 form flow paths in fixed flow path inverter, generally designated as 90. The inverter is similar to that disclosed in U.S. Pat. No. 3,779,282, but is not rotatable and does not necessarily carry the same volume that would pass through the annulus 62. The gas ducts 64 and the air ducts 68 have adjacent annular cross sections at the entrance ends 82 and 80 and at the exit ends 76 and 78, respectively. The gas ducts cross over portions of adjacent or contiguous air ducts longitudinally within the annulus 62 so as to direct flow patterns at the exit ends in a relationship inverted from that existing at the entrance ends so that the gas ducts discharge annularly outwardly of or along the wall portion 70 of the annulus and the air ducts discharge annularly inwardly along the central body portion 54. The gas ducts overlap adjacent air ducts annularly in the annular area 62. The flow volume areas of the gas and air ducts are substantially equal.

Between the walls 34, 36 and 70 of the nozzle are longitudinally directed, slots 94, channel-shaped in cross section. The slots 94 are annularly spaced around the nozzle and contain hydraulic actuators 96 which are adapted to translate aerodynamically-shaped shroud 100, forming the after end of the nozzle. In FIGS. 1 and 4, the shroud is shown in its retracted position and in FIGS. 2, 3, 5 and 6 the shroud is shown in its axially translated extended position. Within the shroud, adjacent its inner end, is an annular thrust reverser 102 formed of segments of longitudinally spaced cascades or blades 104 having concave faces directed forwardly and convex faces directed rearwardly so that gas exhaust forced through the reverser causes the force of the exhaust gas to be directed forwardly to tend to stop the movement of the aircraft on landing, FIG. 6. The thrust reverser segments are normally stowed both in the retracted and extended positions within annular covers 108 having inner annular walls 110 and outer annular walls 112, both extending circumferentially with respect to the nozzle, FIGS. 3-6. The covers 108 are translated on and off the reverser segments by actuators 98 in slots as 94.

Figure 6:
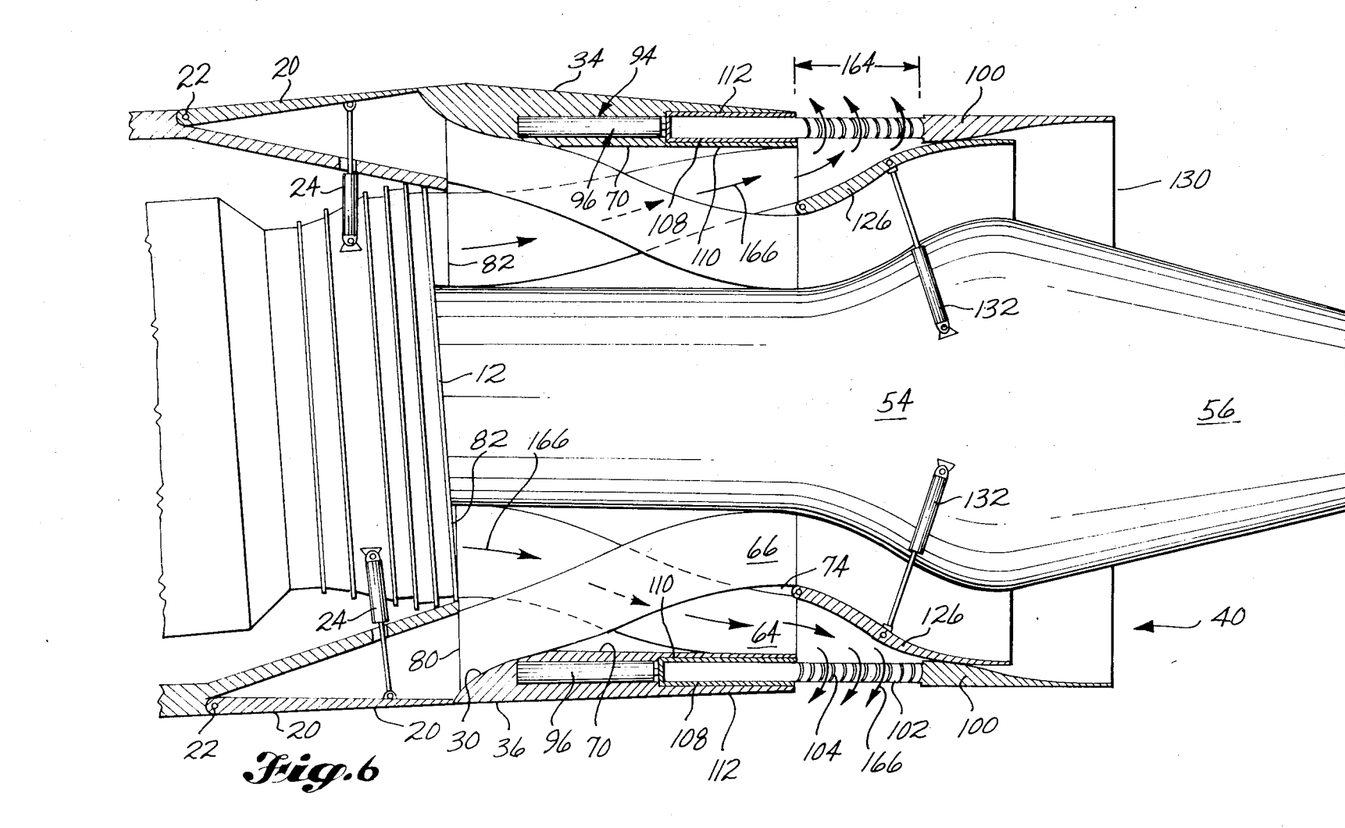
FIG. 6 is an enlarged detailed partially cross-sectional view, illustrating the operating conditions of the noise suppressor as shown in FIG. 3.
Figure 7:
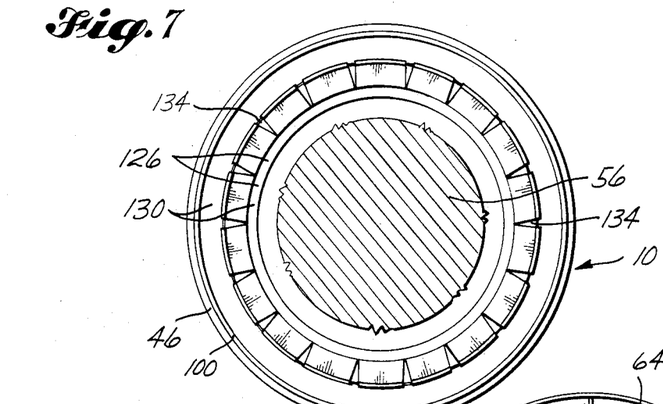
FIG. 7 is a partially cross-sectioned end view taken along the lines 7—7 in FIG. 4.
Figure 10:
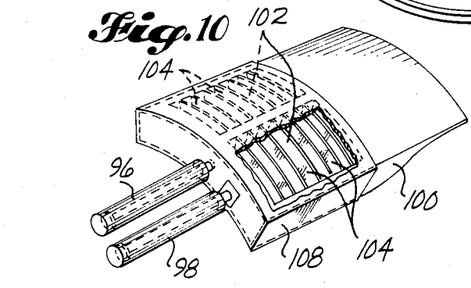
FIG. 10 is a fragmentary pictorial view illustrating the shroud, thrust reverser, and reverser cover in detail.

In FIG. 4, the shroud 100 is in its retracted position for takeoff and subsonic cruise modes of flight, and in FIGS. 5 and 10 the shroud, the thrust reverser 102, and the thrust reverser cover 108 have been translated to the extended position by actuators 96 and 98. The thrust reverser cover is slidably engaged on the thrust reverser and is also slidably engaged within the nozzle walls 70 and 34, as is an inner portion of the shroud. The cover is retracted from the thrust reverser so as to expose it to the exhaust gases, as shown in FIG. 6, by the actuator 98 for the reverse thrust mode. A simpler, but more difficult way to illustrate the translation of the cover and thrust reverser, is by means of switch operated latches.

As shown in FIGS. 4-7, flaps 126 are pivotally mounted on annular wall 74 at 128. The flaps have an aerodynamic configuration and extend in an annulus 130 between the shroud, the thrust reverser cover, and the thrust reverser on the outer wall and the parts 54 and 56 of the fixed plug. The flaps are pivoted by actuators 132 as they are moved radially inwardly and outwardly to direct the gas exhaust and ejector air of the nozzle. The flaps 126 overlap annularly as at 134, FIG. 7, to form an annular seal between the gas exhaust and the air ejector flow paths. Alternate actuation means could also be incorporated within the flaps.

In FIG. 4, the arrows 140 indicate the air flow paths through the entries 26, the ducts 66 and the annular space 144 between the flaps 126 and the surface of the central plug. Similarly, the arrows 142 show the gas exhaust flow path through the ducts 64 and into the annular space between the flaps and the shroud 100 and out into the jet stream where the air and the gas exhaust mixes to suppress the noise on takeoff and subsonic cruise flight. The large volume of air flows in the paths is indicated by the arrows 140; that is, this system provides a maximum amount of ventilation of air for jet noise reduction. It also functions for use for boattail drag reduction at subsonic flight conditions. The ventilation air is induced to flow through the entries 26 to the crossover ducts 66 by the ejector action produced at the nozzle exit at 130.

For subsonic flight only, the present jet noise suppressor may be constructed as a substantially fixed nozzle with ejector entries 26 always open and nozzle flaps 126 fixed, except to operate the thrust reverser if no other means are provided.

In FIG. 5, the doors 20 are shown in the closed positions and the flaps 126 are shown to close off the air path and to fully open the nozzle at 130 to create an annular gas exhaust space 150 between the flaps, the central plug, and the shroud 100 in the extended position with the cover 108 closing the reverser 102. Flow of the gas exhaust is indicated by the arrows 152. This arrangement is for supersonic climbing and cruise modes flight. In these flight modes it may be desirable to have a small amount of air flow through the air ejector by partially opening the doors 20 and providing some small space between the flaps 126 and the central plug.

With the ejector doors 20 closed, the pod shape is nearly smooth. A tradeoff of the ejector door shape and the supersonic pod drag increase is desirable to make a proper choice of ejector door configuration. At supersonic cruise, the flaps 126 are positioned to nearly close off ejector nozzle 130 and all of the exhaust gas travels to the throat 156 of the nozzle and then to the divergent part 150 of the nozzle formed by the translation of the shroud 100 to its aft position. Small amounts of ambient air can still be used to fill the area 130 to provide small changes in throat area 156 as required for normal engine power control. This air can come from inlet boundary layer bleed, inlet normal shock control, nozzle cooling air, engine case cooling air or by a small opening of the ejector doors. The normal jet area variations required are shown by 150 at typical maximum area and 160 minimum area. The small jet area variations require very small amounts of ventilation air.

For reverser operation, FIG. 6, the shroud 100 is in its aft most position and the cover 108 is stowed in the fixed wall or shroud between the wall surfaces 34 and 70 so as to expose the reverser cascades 104. The flaps 126 are driven against the shroud 100 by the actuators 132 and the ejector doors 20 may be opened or closed during the operation of the thrust reverser. The flow of the gas exhaust during reverse is indicated by the arrows 166, being discharged with the flaps against the shroud and through the reverser. This dual use of the flaps eliminates a separate blocker door and actuator that was previously required. The reverser thrust flow area 164 is about twice the normal jet area required because only one half of the perimeter is usable for a properly targeted thrust reverser.

Most supersonic nozzles have the undesirable feature of having no smoothly contoured boattail to turn the external flow at subsonic flight conditions, where there is not enough expansion of the exhaust gas to fill the discharge area of the nozzle.

There have been previous attempts to solve this problem in nozzles other than plug-type nozzles by providing ambient airflow at the outside jet boundary by an ejector which increases the final jet area, thus reducing the amount of external flow turning at the nozzle exit. The plug-type nozzles achieve reduced boattail drag because part of the external flow turning occurs on the center body.

The internally ventilated nozzle of the present invention uses both of these methods to alleviate the boattail problem and should provide better performance than either concept alone. As shown in FIG. 4, the internally ventilated nozzle also allows a relatively gentle and smoothly contoured entry to the ejector because of the small aft end, 12, diameter of the turbojet.

The permitting of the ventilation flow to fill in the unwanted jet area at conditions where the flaps 126 are at intermediate positions, FIG. 4, provides a simplification of the nozzle and saves weight which othewise could not be achieved. If the ventilation air were not used, the drag on the base area caused by the partly open flaps 126, that is, the area between the flaps and the center body, would be excessive. None of the other jet noise suppression devices known provide a noise suppression level near that of the present invention, even if the engine is oversized with no recycling penalties assumed in FIG. 4.

The invention and its attendant advantages will be understood from the foregoing description and it will be apparent that various changes may be made in the form, construction, and arrangements of the parts of the invention without the departing from the spirit and scope thereof or sacrificing its material advantages, the arrangements hereinbefore described being merely by way of example. We do not wish to be restricted to the specific forms shown or uses mentioned except as defined in the accompanying claims.

We claim:

1. In a jet engine nozzle adapted to exhaust a propulsive gas jet,
   said nozzle having wall means longitudinally bounding a generally centrally positioned body, and an annular area extending between said wall means and said body,
   an improved jet engine noise suppressor in said nozzle comprising:
   separate first and second ducts having adjacent annular cross secions at entrance ends and exit ends, said ducts extending longitudinally through a portion of said annular area;
   said first and second ducts being shaped and arranged to invert flow patterns through the respective ducts for discharging two separate flow patterns at the exit ends in a relationship inverted from that existing at the entrance ends;
   said first ducts having entrance ends annularly around said body to receive gas exhaust from the engine and said second ducts having entrance ends radially outwardly of said first ducts and annularly along said wall means;
   openings in said wall means to supply ambient air to the entrance ends of said second ducts;
   doors operable to open and close said openings; and
   means in said nozzle downstream of said portion to vary the flow path size and direction outwardly of said ducts according to the various flight mode requirements of the engine.

2. The invention according to claim 1 in which:
   said first ducts cross over portions of adjacent second ducts longitudinally in said portion of said annular area to invert the relationship of the ends; and
   said first ducts overlap adjacent second ducts annularly in said portion.

3. The invention according to claim 1 including:
   a nacelle forming a part of said wall means upstream of said portion of said annular area, said openings extending annularly around said nacelle and forming inlets of ejectors formed with said second ducts;

said inlets having aerodynamic entry angles to permit substantially axially directed flow through the inlets.

4. The invention according to claim 3, in which:
said means in said nozzle include an axially translatable, generally annular shroud forming a part of said wall means downstream of said portion of said annular area; and
an annulus between said shroud and said body for receiving air from said exits of said second ducts annularly around said body and for receiving gas from said exits of said first ducts radially outwardly of the air and annularly along said shroud.

5. The invention according to claim 4 further including:
a series of flaps annularly arranged in said annulus for directing the gas and air flow from the ducts;
said flaps being pivotally mounted at one end thereof adjacent and between the exits of the first and second ducts; and
means to pivot the flaps for regulating the flow from the respective ducts in accordance with the flight mode requirements.

6. The invention according to claim 5 further including:
a thrust reverser in said shroud normally fitted within a cover; means to translate said cover, shroud, and reverser axially inwardly and outwardly with respect to said portion of said annular area; and
means to remove said cover from said reverser in an axially outwardly position and to return the cover to the normal covering position;
said flaps having axially outer portions being adapted to be pivoted against the shroud downstream of the reverser in the axially outwardly position and uncovered, to direct the gas exhaust through the reverser.

7. The invention according to claim 4 further including:
a series of flaps annularly arranged in said annulus for directing the gas and air flowing from the ducts;
said flaps being pivotally mounted at one end thereof adjacent and between the exits of the first and second ducts; and
means to pivot the flaps to remove them from the flow path out of the first ducts to permit a maximum gas flow for supersonic climbing and cruise modes of flight.

8. The invention according to claim 7 in which:
said flaps being adapted to close said second ducts during said supersonic and cruise modes of flight.

9. The invention according to claim 8 in which:
said means to pivot the flaps being adapted to position the flaps in the annulus in a predetermined position to allow the proper gas and air flow in the annulus during takeoff and subsonic cruise modes of flight.

10. The invention according to claim 4 further including:
means to translate said shroud axially inwardly for takeoff, subsonic cruise, and transonic climb flight modes and to translate the shroud axially outwardly for reverse thrust and supersonic climb and cruise modes;
the surfaces of said shroud being aerodynamic;
said annulus being enlarged axially and radially outwardly when the shroud is translated outwardly and said annulus being decreased axially and radially when the shroud is translated axially inwardly.

11. In a jet engine nozzle adapted to exhaust a propulsive gas jet, said nozzle having wall means longitudinally bounding a generally centrally positioned body, and an annular area extending between said wall means and said body,
an improved jet engine noise suppressor in said nozzle, comprising:
separate gas and air flow ducts having entrance ends and exit ends, said ducts extending longitudinally through a portion of said annular area;
said gas ducts having entrance ends annularly around said body to receive gas exhaust from the engine and said air ducts having the entrance ends radially outwardly of said gas ducts annularly along said wall means;
openings in said wall means upstream of said portion of said annular area to supply ambient air to the entrance ends of said air ducts;
doors in said wall means operable to open and close said openings;
means within said wall means to open and close said doors;
means within said ducts to invert flow patterns at the exit ends in a relationship inverted from that existing at the entrance ends so that said gas ducts discharge radially outwardly annularly along said wall means and said air ducts discharge radially inwardly annularly along said body; and
means in said nozzle downstream of said portion of said annular area to vary the flow path size and direction downstream and outwardly of said ducts according to the various flight mode requirements of the engine.

12. The invention according to claim 11 in which:
said means within said ducts include said gas and air ducts having adjacent annular cross sections at said entrance ends and exit ends;
said gas ducts cross over portions of adjacent air ducts longitudinally in said portion of said annular area to invert the relationship of the ends; and
said first ducts overlap adjacent second ducts annularly in said portion.

13. The invention according to claim 11 including:
a nacelle forming a part of said wall means upstream of said portion of said annular area, said openings extending annularly around said nacelle and forming inlets of ejectors formed with said air ducts;
said inlets having aerodynamic entry angles to permit substantially axially directed flow through the inlets.

14. The invention according to claim 13 in which:
said means in said nozzle include an axially translatable, generally annular shroud forming a part of said wall means downstream of said portion of said annular area; and
an annulus between said shroud and said body for receiving air from said exits of said air ducts annularly around said body and for receiving gas exhaust from said exits of said gas ducts radially outwardly of the air and annularly along said shroud.

15. The invention according to claim 14 further including:
a series of flaps annularly arranged in said annulus for directing the gas and air flow from the ducts;
said flaps being pivotally mounted at one end thereof adjacent and between the exits of the gas and air ducts; and means to pivot the flaps for regulating the flow from the respective ducts in accordance with the flight mode requirements.

16. The invention according to claim 15 further including:
a thrust reverser in said shroud normally fitted within a cover; means to translate said cover, shroud, and reverser axially inwardly and outwardly with respect to said portion of said annular area; and
means to remove said cover from said reverser in an axially outwardly position and to return the cover to the normal covering position;
said flaps being pivotally mounted at one end thereof adjacent and between the exits of gas and air ducts; and
means to pivot the flaps to remove them from the flow path out of the gas ducts to permit a maximum gas flow for supersonic climbing and cruise modes of flight.

17. The invention according to claim 16 in which:
said flaps being adapted to close said air ducts during said supersonic and cruise modes of flight.

18. The invention according to claim 17 in which:
said means to pivot the flaps being adapted to position the flaps in the annulus in a predetermined position to allow the proper gas and air flow in the annulus during takeoff and subsonic cruise modes of flight.

19. The invention according to claim 14 including:
means to translate said shroud axially inwardly for takeoff and subsonic flight modes and to translate the shroud axially outwardly for reverse thrust and supersonic climb and cruise modes;
the surfaces of said shroud being aerodynamic;
said annulus being enlarged axially and radially outwardly when the shroud is translated outwardly and said annulus being decreased axially and radially when the shroud is translated axially inwardly.

20. In a jet engine nozzle adapted to exhaust a propulsive gas jet, said nozzle having wall means longitudinally bounding a generally centrally positioned body, and an annular area extending between said wall means and said body,
an improved jet engine noise suppressor in said nozzle, comprising:
separate gas and air flow ducts having entrance ends and exit ends, said ducts extending longitudinally through a portion of said annular area;
said gas ducts having entrance ends annularly around said body to receive gas exhaust from the engine and said air ducts having entrance ends radially outwardly of said gas ducts annularly along said wall means;
openings in said wall means upstream of said portion of said annular area to supply ambient air to the entrance ends of said air ducts;
means within said ducts to direct flow patterns at the exit ends in a relationship inverted from that existing at the entrance ends so that said gas ducts discharge radially outwardly annularly along said wall means and said air ducts discharge radially inwardly annularly along said body; and
means in said nozzle downstream of said portion of said annular area to direct the flow paths downstream and outwardly of said ducts in predetermined amounts to achieve the desired noise suppression in the jet.

21. The invention according to claim 20 in which:
said means within said ducts include said gas and air ducts having adjacent annular cross sections at said entrance ends and exit ends;
said gas ducts cross over portions of adjacent air ducts longitudinally in said portion of said annular area to invert the relationship of the ends; and
said first ducts overlap adjacent second ducts annularly in said portion.

22. The invention according to claim 20 including:
a nacelle forming a part of said wall means upstream of said portion of said annular area, said openings extending annularly around said nacelle and forming inlets of ejectors formed with said air ducts;
said inlets having aerodynamic entry angles to permit substantially axially directed flow through the inlets.

23. The invention according to claim 22 in which:
said means in said nozzle include an axially translatable, generally annular shroud forming a part of said wall means downstream of said portion of said annular area; and
an annulus between said shroud and said body for receiving air from said exits of said air ducts annularly around said body and for receiving gas exhaust from said exits of said gas ducts radially outwardly of the air and annularly along said shroud.

24. The invention according to claim 23 further including:
a series of flaps annularly arranged in said annulus for directing the gas and air flow from the ducts.

25. The invention according to claim 24 further including:
a thrust reverser in said shroud normally fitted within a cover; means to translate said cover, shroud, and reverser axially inwardly and outwardly with respect to said portion of said annular area; and
means to remove said cover from said reverser in an axially outwardly position and to return the cover to the normal covering position;
said flaps being pivotally mounted at one end thereof adjacent and between the exits of gas and air ducts; and
means to pivot the flaps to direct the gas exhaust flow into the thrust reverser when the cover is removed.

* * * * *